DATA PROCESSING APPARATUS

Filed Dec. 22, 1958 3 Sheets-Sheet 1

INVENTORS.
WERNER FLIEG
IRVING JASPHY
BY
ALAN K. ROBERTS
ATTORNEY.

Oct. 25, 1960 W. FLIEG ET AL 2,957,523

DATA PROCESSING APPARATUS

Filed Dec. 22, 1958 3 Sheets-Sheet 2

INVENTORS.
WERNER FLIEG
IRVING JASPHY
BY
ALAN K. ROBERTS
ATTORNEY.

INVENTORS.
WERNER FLIEG
IRVING JASPHY
BY
ALAN K. ROBERTS.
ATTORNEY.

United States Patent Office 2,957,523

Patented Oct. 25, 1960

2,957,523

DATA PROCESSING APPARATUS

Werner Flieg and Irving Jasphy, Brooklyn, N.Y., assignors, by direct and mesne assignments, to Invac Corporation, Waltham, Mass., a corporation of Delaware Filed Dec. 22, 1958, Ser. No. 782,136

24 Claims. (Cl. 164—112)

This invention relates to data processing apparatus, and more particularly to means for representing data in a form which is useful in data processing equipment and the like.

Since the invention will be most readily understood by reference to a specific example, the objects and features of the invention will hereinafter be set forth with respect to apparatus for punching paper tape. It is to be understood, however, that the invention is adapted for other types of application such as, for example, magnetic recording, printing operations and so forth. In fact, it is one of the features of the invention that provision be made for printing on a paper tape while punching a coded representation into the same.

It is one of the primary objects of the invention to provide improved apparatus of the nature indicated above and which can be manufactured or otherwise made available with a significant savings in cost as compared with known types of similar apparatus which are currently available.

More specifically, it is an object of the invention to provide improved apparatus which avoids the necessity for employing complex and costly components which furthermore require substantial maintenance and deleteriously affect the longevity of the apparatus into which they are incorporated.

For example, in coding apparatus, mechanical or electrical matrices are commonly employed for the purpose of converting decimal data or the like into code groups expressed, for example, in the well known binary system. These matrices are generally quite complex and, accordingly, it is an object of the invention to avoid the use of the same.

Furthermore, in punching, printing and similar operations, the final operation of recording items of data or groups of these items is generally performed as a sequence of steps such as, for example, the individual printing of each of a series of numbers. In conventional apparatus which employs some type of driving apparatus which controls an output stage, it has heretofore been the practice either to inactivate the driving apparatus to permit a control of the output stage or to decouple the driving apparatus from the output stage. Accordingly, it is an object of the invention to avoid the need for continually actuating and inactivating apparatus for driving associated output mechanisms and to avoid the use of clutches and the like which are commonly employed for coupling and decoupling drive and output stages of encoding equipment.

As noted above, an object of the invention relates to the provision of improved means for both punching a paper tape and printing upon the same. Stated otherwise, the invention contemplates the provision of improved means for recording information on a medium in two or more forms.

Recording of information on a medium in two or more forms provides a very simple method of cross-checking data and is thus considered as being a desirable feature.

However, it is an object of the invention to provide this feature by the use of improved and simple arrangements as are consonant with the above-noted requirement of economy.

Briefly, to achieve the above and other of its objectives, the invention contemplates, in accordance with one of its embodiments, the use of recording means with which is operatively associated a power source the function of which is to drive the recording means to assume a position whereat it can selectively record a predetermined data item; selection means are employed to control the recording means to record data as desired; and improved means are employed to couple the power source to the recording means so that both of these latter two elements can operate substantially independently of one another.

With the recording means and power source operating substantially independently, it is unnecessary to employ clutches and the like or to interrupt the operation of the power source continually. In accordance with a feature of the invention, this advantageous result is achieved by coupling the power source and recording means by the use of a power storage device which can be, for example, a resilient mechanism. Thus, a power source can be continuously operated until the associated storage device is primed to capacity, a further feature of the invention providing for the automatic inactivating of the power source under this unusual circumstance.

Still another feature of the invention relates to the specific simplified apparatus employed to avoid the use of matrices and the like. For example, the invention contemplates the use of a simple rotatable shaft operatively associated with a disc upon which are aligned different code representations. The shaft is provided with stops or the like with which are associated an improved arrangement of control members which can be manually or otherwise operated to control the operation of the disc.

Advantageously, the invention avoids the necessity of employing punching mechanisms the operation of which is substantially dependent upon the inclusion of members which need all be prepared in accordance with very close tolerances of dimensions.

Other objects, features and advantages of the invention will be found in the following detailed description of a preferred embodiment as illustrated in the accompanying drawing, in which.

Figure 1:
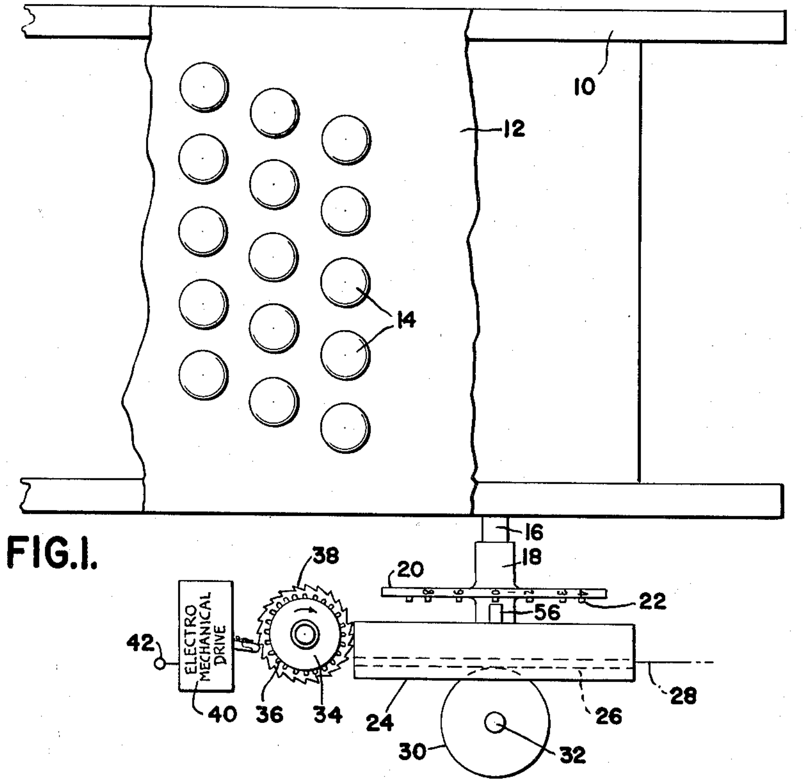
Fig. 1 is a diagrammatic view, from above, of a device for punching tape in accordance with the invention, the view indicating a keyboard and a mechanism for both punching the tape and printing upon the same.

In Fig. 1 is indicated generally a frame 10 which houses or supports the various components of apparatus provided in accordance with the invention. On the frame 10 is positioned a top plate 12 which accommodates and slidably supports a number of rows of diagonally displaced, manually operated keys 14.

The keys 14 operate a selector mechanism, as will hereinafter be described. It is the function of the keys and, therefore, of the selector mechanism to select appropriately one of a number of coded groups which are employed in the printing and punching mechanism, as will hereinafter be described in greater detail.

A portion of the printing and punching mechanism is indicated diagrammatically in Fig. 1, and extends outside of the frame 10 to the right, as indicated in the drawing.

This mechanism includes a selector shaft 16, upon which is axially displaceable a collar 18, affixed to which is a disc 20. The disc 20 is provided with a number of pins or cams 22 which extend generally in an axial direction relative to the shaft 16, and laterally from one of the opposite faces of the disc 20.

Also indicated in Fig. 1 is a block or housing 24 which, as will be shown, houses the punching pins as well as a printing cushion, the block 24 defining a passage 26 for accommodating a paper tape 28.

Further indicated in Fig. 1 is a printing wheel 30, the shaft 32 of which is arranged perpendicularly to the shaft 16. The block 24 and the shaft 32 are supported by conventional means which are not illustrated in the drawing, so as to facilitate an understanding of the structure of the invention.

Operatively associated with the block 24 and with the paper tape 28 is a sprocket wheel 34 having peripheral pins 36, the function of which is to drive the paper tape 28 by engaging perforations conventionally provided in the latter. As will be explained hereinafter in greater detail, the sprocket wheel 34 is rotated through the action of a gear 38 driven by an electromechanical drive 40 which is controlled by signals received via terminal 42.

Figure 2:
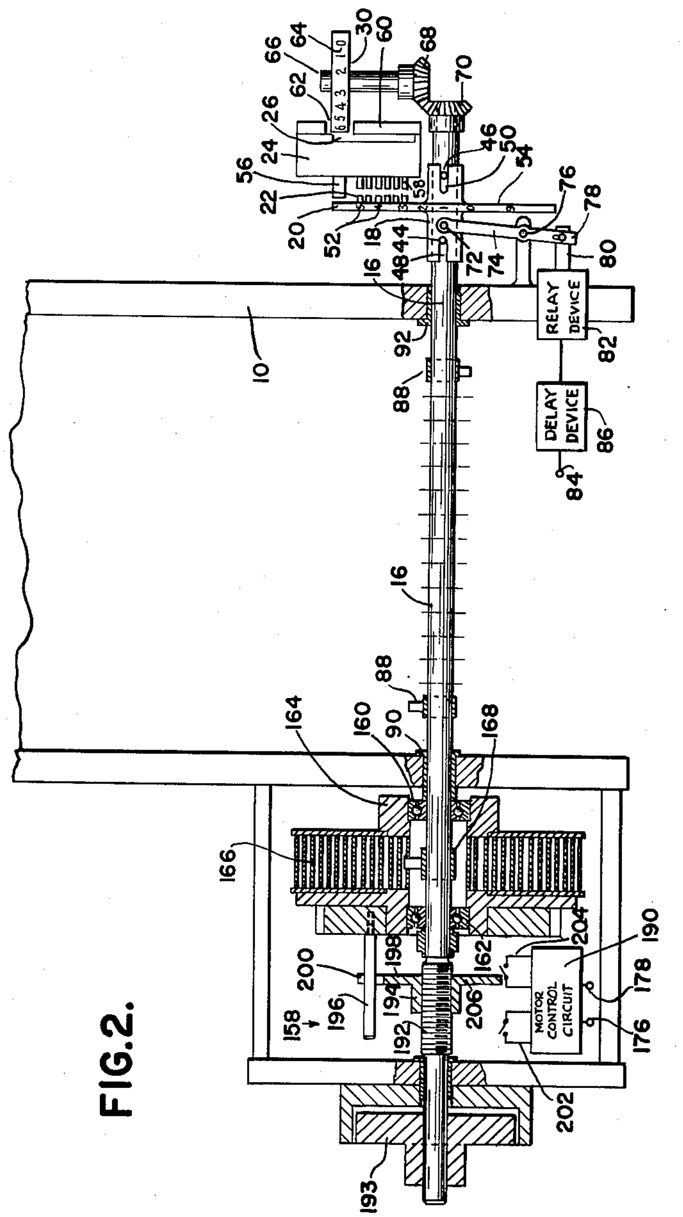
Fig. 2 is a diagrammatic view, from the bottom, of the apparatus of the invention, indicating the mechanism for punching a paper tape and printing on the latter, along with the apparatus for driving the printing and punching mechanism and further illustrating a portion of the selector mechanism adapted for selectively positioning the punching and printing mechanism.

A lateral view of the printing and punching mechanism is given in Fig. 2, and illustrates more clearly some of the details of the printing and punching mechanism.

In Fig. 2 is illustrated the shaft 16, upon which is axially displaceable the collar 18. The shaft 16 is provided with a radially extending pin 44 which is fixed in position on the shaft, as well as a further and similar pin 46 which is axially spaced from the first said pin. The collar 18 defines two open slots 48 and 50, respectively accommodating the pins 44 and 46. This structure assures that the collar 18 and, therefore, the disc 20 are affixed to the shaft 16 for rotation therewith, the arrangement also permitting an axial displacement of the collar 18 and the disc 20 relative to said shaft.

The disc 20 is provided with a plurality of peripheral indications of code groups of pins which extend laterally from a face of the disc. For example, the peripheral indications 52 may be the digits of the decimal system (e.g., the digits 0 through 9), or may be, by way of further example, the letters of the alphabet. This is purely a matter of choice and is not to be considered as limiting the invention to a particular code.

From the right hand face of the disc 20, this face being generally indicated by reference character 54, extends a plurality of pins, as indicated above with respect to Fig. 1. These pins, as will be additionally illustrated and described hereinafter, are preferably arranged or aligned in radially extending arrays, the common center for which is preferably the axis of rotation of the shaft 16. These pins are the pins 22 of Fig. 1 and constitute, by their presence or absence, devices which control whether or not the paper tape 28 is to be punched in a particular position.

Digressing temporarily from a description of the apparatus of the invention, it is to be noted that data is most frequently represented on a paper tape by the presence or absence of a hole in a particular position. More particularly, this is a binary type of representation, wherein information is encoded by means of particular arrangements of holes or absences of holes in accordance with a predetermined code. For example, information may be represented in the binary code or in any other predetermined code, and groups of pins can be provided in accordance with the code for purposes of punching representations of data items into a paper tape.

Accordingly, although a group of six pins has been represented in Fig. 2, the different radially extending alignments of these pins will differ as to number and/or as to position. These arrangements are believed to be too well known per se to warrant discussion here.

Referring again to the printing and punching structure illustrated in Fig. 2, there is further indicated in this figure the block 24 provided with passage 26 through which the paper tape 28 is intended to extend. The block 24 slidably accommodates a printing cushion 56, as well as the punching pins 58 which are capable of extending through the block 24 into the passage 26, whereat a punching of the paper tape 28 is effected.

The proper positioning of the punching pins 58 in the block 24 is very important, and the positioning of these pins must be effected with regard to very close tolerances. The reason for the positioning of the pins 58 in very accurate manner is that the punched tape which will be issued from the mechanism must be employed with independent reading mechanisms which must have a common dimensional basis with the punching operation.

However, in accordance with the invention, the rigorous positioning of the punching pins 58 does not control the positioning of the pins 22, since these latter pins have only the function of engaging selectively the punching pins 58, and thus do not perform any direct operation on the paper tape itself. It is, therefore, only necessary that the pins 22 confine themselves to engaging no more than one of the associated punching pins respectively, and it follows that the pins 22 may be positioned without any strict regard to tolerances. This constitutes one of the features of the invention and, more specifically, concerns the manufacture of the disc 20 which, as a result, is a very inexpensive mechanism.

The block 24 is provided with a cover plate 60 which defines an aperture 62 opening into the passage 26. The opening 62 accommodates the periphery of the printing wheel 30, upon which are raised characters 64 corresponding to the code groups constituted by pins 22. The raised characters 64 cooperate with the printing cushion 56 to print characters on the paper tape, which are simultaneously punched into the tape by the pins 58.

Printing wheel 30 is supported on a shaft 66, which is coupled to a bevel gear 68. The bevel gear 68 mates, with a one-to-one ratio, with a bevel gear 70 affixed to the end of the shaft 16. It therefore follows that the disc 20 and wheel 30 are rotated by the same amounts and at the same speed by the shaft 16, so that a presentation of a raised character 64 to the paper tape corresponds to the code group of pins 22 which control the punching of the tape.

As indicated above, the disc 20 is supported on a collar 18, which is axially displaceable along the shaft 16. The collar 18 is provided with a pivot 72, to which is affixed a lever 74 pivoted upon the fixed pivot 76. The pivot 76 is stationary relative to the frame 10 and is supported by conventional means which are not illustrated in the drawing, for purposes of simplification. The end 78 of lever 74 is pivoted to a rod 80, which is displaceable in its longitudinal direction. Movement of the rod 80 is controlled by a conventional relay device 82, which is operated by signals received via a terminal 84, and a conventional delay device 86 which may be, for example, a conventional resistance-capacitor circuit. The purpose of this delay will be explained hereinafter.

Within the frame 10 and on the shaft 16 are positioned a plurality of stops or cams 88. The stops 88 are axially spaced along the shaft 16, as diagrammatically indicated, there being one stop for each of the radially aligned groups of pins 22. The stops 88 are angularly displaced around the shaft 16 in symmetrical manner, each stop occupying a determinable angular position relative to the shaft 16, which position corresponds to the angular position of a corresponding code group on the disc 20.

It is to be noted that if there are X number of code groups on the disc 20, then there are also X number of stops 88 on the shaft 16. The angular distance in degrees between the stops 88 is then equal to 360° divided by X.

It will be appreciated that, as a result of the structure indicated above, selective rotation of the shaft 16 will properly position a determinable code group on the disc 20 adjacent the punching pins 58. The code group is selected by means of the stops 88, by apparatus which will be hereinafter described, and to enable a rotation of the shaft 16 this shaft is supported in the frame 10 by means of bearings 90 and 92.

The use and operation of the shaft 16 constitutes one of the features of the invention. The apparatus for controlling the shaft 16 by means of the stops 88 likewise constitutes a feature of the invention, and preferred apparatus therefor is illustrated diagrammatically in Fig. 3.

Figures 3, 4:
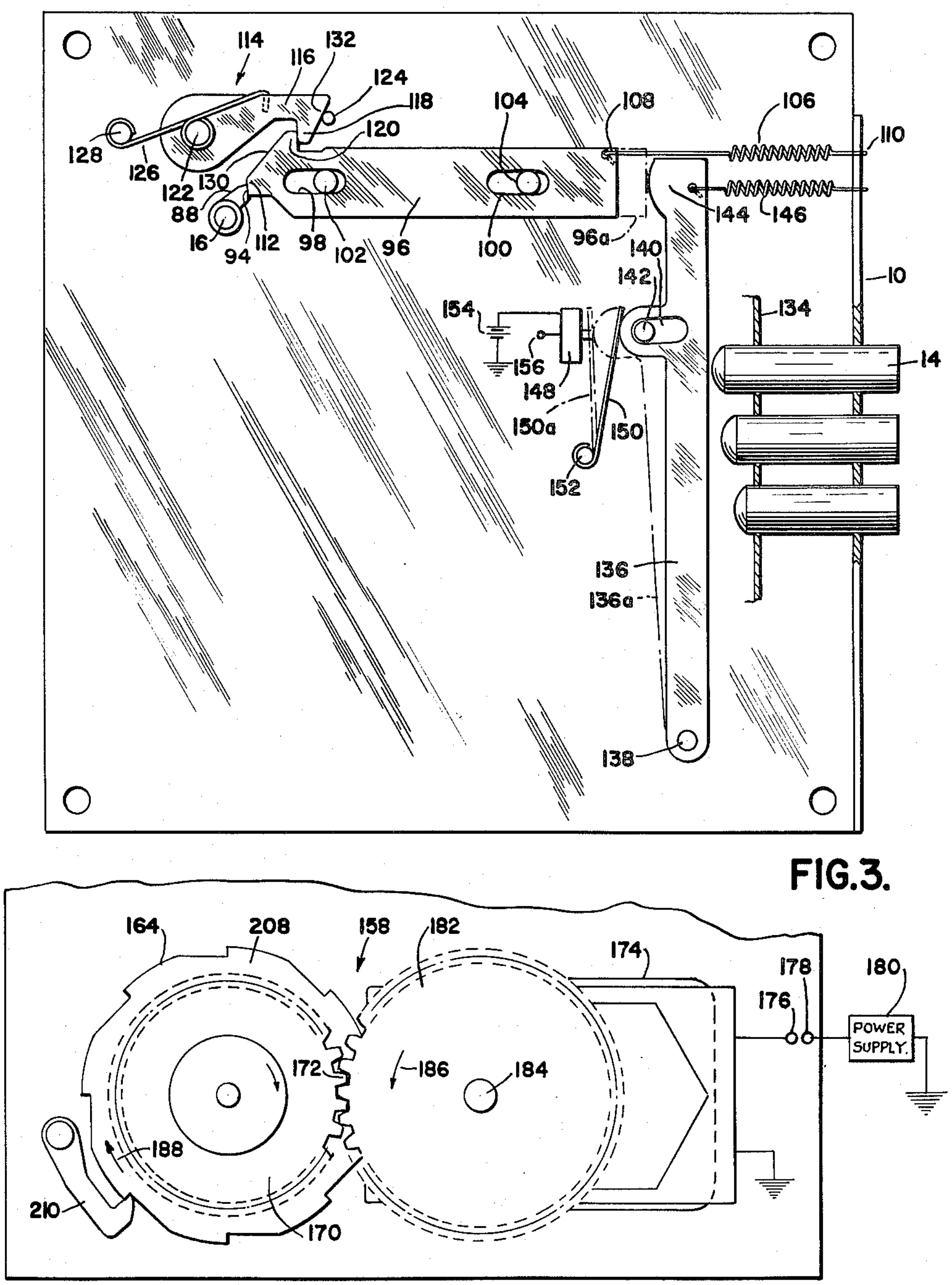
Fig. 3 is a diagrammatical view, from the side, of the details of the selector mechanism in operative association with the keyboard of the device.
Fig. 4 is a diagrammatical view, from the side, of the mechanism which is employed to drive the punching and printing mechanism.

In Fig. 3 is illustrated an end section of the shaft 16, with a stop or cam 88 affixed thereto by means of welding or a set screw (not shown). Each stop 88 projects generally radially outwards from the shaft 16 and includes an abutting portion or stop surface 94. In operative association with each of the stops 88 is an interposer member or longitudinally displaceable rod 96, one of which is illustrated in Fig. 3. The interposers 96 are arranged in a linearly aligned series, one next to the other, these interposers being spaced along the shaft 16 in correspondence with the stops 88.

Each interposer 96 defines an elongated slot 98 and 100 the function of which is to accommodate a rod or pin 102 and 104 respectively. It is to be noted that a pair of rods corresponding to pins 102 and 104 will suffice generally for the entire row of interposers 96, it being sufficient that provision be made for a longitudinal displacement of these rods under the influence of a control which will be described hereinafter.

Normally, the interposers 96 are urged into a position indicated by dotted lines 96*a*, by means of a resilient device such as a spring 106 which is connected at one end 108 to an interposer 96 and at the other end 110 to the frame 10. In the position indicated at 96*a*, the interposers 96 do not engage the associated stops 88, and thus cannot prevent a rotation of the shaft 16.

Each interposer 96 is provided with a stop surface 112 which, when the interposer 96 is displaced to the left as indicated in Fig. 2, moves into a position of interference such that the stop surface 94 of the associated stop 88 will move into abutting relationship with the surface 112. It therefore follows that a general function of the interposer 96 is to engage a stop 88 to prevent rotation of the shaft 16.

It is necessary, as will become evident, that an interposer 96 must remain in the position indicated in Fig. 3 for a period of time which is sufficient for the execution of a punching and printing operation. Thus, since the shaft 16 might be provided with sufficient torsional force to displace the interposers 96 to the right which might also be caused by the operation of spring 106, there is provided a locking mechanism generally indicated at 114. This locking mechanism preferably takes the form of a latch bar 116, which extends along the entire array of interposers 96 and is common to all of these latter members. The latch bar 116 is provided with a hooked portion 118, the purpose of which is to engage behind the hooked portion 120 of the various interposers 96. Latch bar 116 is pivotally supported on a shaft 122 and is normally urged into its illustrated operative position against a stop 124 by means of a spring 126 supported on a pin or like mechanism 128. The shaft 122, the stop 124 and pin 128 are all supported in relatively fixed positions by conventional means on the frame 10. The latch bar 116 is pivoted on or about the shaft 122 for a specific purpose which will next be described.

Assuming that one interposer is in operative position as illustrated in Fig. 3, it follows that the associated stop 88 is being engaged by this interposer and that the shaft 16 is rotationally fixed. This causes a selection of one of the code groups on the disc 20 and provides for the performance of a single punching and printing operation. When this operation has been completed, it will be generally desired that the next printing and punching operation be performed. This requires a movement of the ilustrated interposer 96 to the right, so that the shaft 16 is freed for rotation and the movement of another of the array of interposers 96 into operative position, whereat it can engage the stop 88 associated therewith. For this reason, the latch bar 116 is pivotally supported. To enable the release of one interposer and the substitution of another one of these elements in operative position, the interposers 96 are each provided with a cam surface 130. For cooperation with these cam surfaces, the latch bar 116 is provided with a cam surface 132. The cam surface 132 and the cam surfaces 130 are preferably, but not necessarily, of a like inclination.

As a result of the provision of the above-indicated cam surfaces, the movement of an interposer 96 to the left in Fig. 2 will bring the associated cam surface 130 into engagement with the cam surface 132. The latch bar 116 will be caused to pivot counter-clockwise with respect to shaft 122, and the interposer 96 previously in operating position (the position illustrated) will be released and will move to the right to its normal inoperative position under the influence of spring 106, as well as under the influence of the rotation of shaft 16. The interposer 96 which is being moved into operative position will assume a position whereat its hooked portion 120 can be engaged by the hooked portion 118 of the latch bar 116, and upon the release of one of the interposers 96 the next succeeding interposer 96 may be engaged by the latch bar 116, which is urged to pivot in clockwise manner by the influence of spring 126.

The movement of interposers 96 from inoperative to operative positions is controlled by means of keys 14, three of which are illustrated in Fig. 3. It will be recalled, however, that there is a larger number of these keys and, in fact, one key is provided for each interposer 96 and, therefore, for each stop 88 and for each code group on the disc 20. The keys 14 are slidably supported by the frame 10 and by supplementary frame member 134. For each key 14 and each corresponding interposer 96, there is provided a lever 136 pivoted on a rod 138, which may be common to all of the latter said levers. Each lever defines a slot 140 for accommodating a guide pin 142. Moreover, each lever 136 is provided with an abutment portion 144 and with a spring 146 which urges the associated lever 136 into the normal inoperative position shown in dotted lines. It is to be noted that the spring 146 not only spring-loads the associated lever 136, but the associated key 14 as well. The keys 14 are, therefore, also provided with normal positions of rest.

The depressing of any one of the keys 14 causes a displacement of the corresponding lever 136 to the position indicated at 136*a*. This action causes a force to be exerted by the corresponding abutting portion 144 against the associated interposer 96 and effects a positioning of the latter which has been described above. After having urged the associated interposer 96 into its operative position, the operated lever 136 returns to its normal position of rest, from which it can later be displaced as required.

The actuation of any of the levers 136 causes the operation of a switch 148 through the intermediary of a lever 150 which is spring-loaded and pivoted on a pin 152. Lever 150 is common to all of the levers 136 and is displaceable by the movement of any one of the same to the position indicated at 150*a*. The switch 148 is connected in conventional manner between a voltage source 154 and a terminal 156. As will be explained, the switch 148 controls the operation of the tape stepping mechanism which has been described above with respect to Fig. 1. In fact, the terminal 156 is connected to terminal 42 in Fig. 1, and thus these terminals perform the function of coupling voltage source 154 to electromechanical drive 40 in Fig. 1.

The structure which has been described above is that portion of the structure which enables a selection of a code group on the disc 20 for purposes of punching holes in paper tape 28, this structure also providing for adjusting the position of wheel 30 in Fig. 2 for purposes of printing a corresponding character on the tape. The actual physical operations of punching and printing, however, require an axial displacement of the disc 20 relative to the shaft 16. For example, it is to be noted that if the disc 20 is displaced to the right in Fig. 2, pins 22 will selectively displace pins 58 into block 24, whereby the tape will be punched and disc 20 will engage printing cushion 56 and displace the same to the right against printing wheel 30. This actuation of disc 20 is controlled by signals received at terminal 84, and terminal 84 is, in the illustrated structure, connected to terminal 156 of Fig. 3.

The circuitry illustrated in Fig. 2 may be conventional. However, there is a certain desired sequence of operations which is important to a proper functioning of the invention. Assuming that one punching and printing operation has been effected, it will be necessary to step the tape in its longitudinal direction, such that the next printing and punching operation will be effected on the next adjacent portion of the tape. The following time sequence and operations are preferred: When a key 14 is depressed and the switch 148 actuated, voltage source 154 is connected to terminal 156 and, therefore, to terminals 42 and 84. The signal received at terminal 84 is delayed by conventional delay circuits in device 86, but is transmitted immediately to electro-mechanical drive device 40. Electro-mechanical drive device 40 operates immediately through ratchet 38 by a pawl (not shown) to cause the paper tape 28 to be stepped by a distance corresponding to the distance between pins 36 on sprocket wheel 34. The paper tape 28 is thus immediately positioned to accept the next sequential item of information, which is that item of information represented by the depressed key 14. The depression of the key 14 also operates to actuate an interposer 96, which moves into position to intercept a stop 88. Shaft 16 is thus properly positioned in accordance with the selected key 14, and a code group on the disc 20 is aligned with the single set of punching pins 58. The delay device 86 delays the transmission of the signal received at terminal 84 for a period of time which enables the disc 20 to be positioned properly. This delay period may correspond, for example, to the length of time which is required for the shaft 16 to rotate through 360°. This period of time is readily calculated from a determination of the rotational speed of the shaft 16 under the influence of its rotary power source, which is to be described hereinafter. Alternatively, it is possible to arrange a switching mechanism which is operated upon the halting of the rotation of shaft 16.

In the illustrated arrangement, the signal received at terminal 84 is transmitted via delay device 86 to a conventional relay device 82. The relay device is actuated by the applied signal and causes a displacement of rod 80, which axially displaces disc 20 outwardly along the shaft 16. This displacement, with the tape having previously been stepped to the next adjacent position, causes an operation of punching pins 58 and a displacement of printing cushion 56 against wheel 30.

Reference will next be made to Figs. 2 and 4 for the illustrating and describing of a rotary power source 158, which is employed to supply the necessary rotary power for the shaft 16. The rotary power source 158 constitutes one of the features of the invention, and it will be noted in the description which follows that an electrical motor is provided which may be substantially continuously operated, despite the fact that shaft 16 is frequently and intermittently brought to abrupt stops for the proper positioning of disc 20.

Shaft 16 extends through the frame 10 and rotatably supports bearings 160 and 162. On these bearings is supported a housing 164, within which is accommodated a spiral spring 166. The inner end of the spiral spring is affixed to the shaft 16 by means of a coupling member 168. The other end or the outer end of the spring 166 is connected to the housing 164.

As shown in Fig. 4, a disc 170 is affixed to the housing 164, so that the same are rigidly rotated together. The entire periphery of the disc 170 is formed as a gear 172. An electric motor 174 is provided as a source of rotary power. The motor 174 is connected via terminals 176 and 178 to a power supply 180 of appropriate type. The purposes of terminals 176 and 178 will be indicated hereinafter. Motor 174 functions to rotate a spur gear 182, which is provided around its entire periphery with teeth appropriate for meshing with those of the gear 172. Gear 182 is conventionally mounted for rotation upon a shaft 184.

Gear 182 rotates in the direction indicated by arrow 186. This, in turn, causes a rotation of gear 172 and thus housing 164 in the direction indicated by arrow 188.

It will be recalled that the housing 164 is rotatably supported on shaft 16 by means of bearings 160 and 162. A rotation of housing 164 does not, therefore, rotate shaft 16. Instead, the direction of rotation of the housing 164 has the effect of winding the spiral spring tightly on the shaft 16, so that the spring 166 constitutes effectively a storage device for storing rotational power or energy supplied by the motor 174. The shaft 16 may, therefore, tap this stored power as necessary and as permitted by a release of the stops 88 by interposers 96. This feature of the invention enables a source of rotary power to be operated substantially continuously, without the need for frequent and intermittent interruption, as would be caused by an engagement of the stops 88.

There are certain circumstances, however, in which it may be desirable to shut off the motor 174. Such an instance may be, for example, the situation whereupon the spring 166 has been wound to a maximum. The invention, therefore, provides a motor control circuit 190 which is provided with ancillary apparatus, as will next be described. The shaft 16 is provided with a threaded extension 192. On extension 192 is provided a conventional governor 193, the function of which is to prevent a rapid unwinding of spring 166 and thereby control the average rotational velocity of shaft 16. Loosely but threadably engaged with extension 192 is an internally threaded collar 194. A pin 196 is mounted on and extends laterally from the housing 164, and is substantially parallel with the threaded extension 194. Mounted on the collar 194 is a lug 198 provided with an aperture 200, in which is slidably accommodated the pin 196. A rotation of the shaft 16 tends to urge the collar 194 in one direction along threaded extension 192, and a rotation of the housing 164 tends to move the collar 194 in the opposite axial direction along the threaded extension 192.

From the structure described above, it follows that an unwinding of the spring 166 will displace the collar 194 towards one extremity of threaded extension 192, while a winding of the spring 166 tends to move the collar 194 to the opposite extremity. At these two extremities are provided switches 202 and 204, which are operatively engaged by a lug 206 on the collar 194. Lug 206 mechanically operates one of the switches 202 or 204 when the collar 194 has approached one of the above-mentioned extremities, indicating that the spring 166 has been wound sufficiently or requires additional winding. Switches 202 and 204 operated in conventional manner to control the motor control circuit 190, which is connected between terminals 176 and 178 to thus control the starting and stopping of motor 174.

It will be noted that in the structure described above the housing 164 will tend to rotate in one direction only under the influence of spring 166. To prevent this undesirable rotation, the motor 174 can be coupled to the gear 182 by means of a worm and worm gear, the operation of which is inherently irreversible. Alternatively, a structure such as indicated in Fig. 4 can be employed in accordance with which housing 164 is provided with a ratchet 208 engaged by a spring-loaded pawl 210. This structure prevents the housing 164 from being rotated other than by operation of the motor 174, and thus an unintentional unwinding of spring 166 is prevented.

The structure provided above provides a continuous source of rotary power for the shaft 16. It provides this rotary power as intermittently required by the shaft 16, without the use of clutching elements or like expensive components which are subject to deterioration and, therefore, require substantial maintenance. The rotary power source, therefore, represents with its storage device a remarkable advance in the data processing field.

Figure 5:
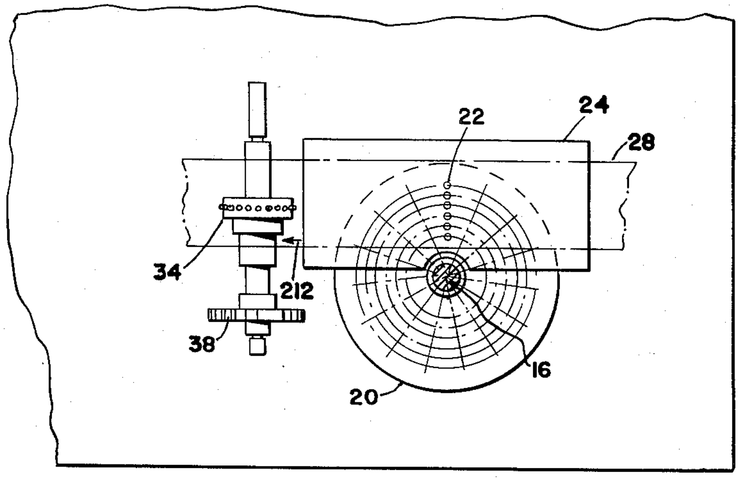
Fig. 5 is a diagrammatical view, from the side and in enlarged scale, of the punching mechanism employed in accordance with the invention.

Fig. 5 shows generally the arrangement of block 24 and the passing of tape 28 therethrough. Also illustrated is the sprocket wheel 34 mounted on a shaft also supporting gear 38. Preferably, the tape 28 is moved through the block 24 with a pulling motion, as indicated by arrow 212.

Further illustrated in Fig. 5 is shaft 16, upon which is indicated disc 20. On disc 20 are indicated the radial alignments of pins 22, each group constituting a predetermined code group for engaging the punching pins 58. It is to be noted that the angular displacement between adjacent groups corresponds to the angular displacement between stops 88 on shaft 16. Accordingly, each group is assignable to a stop 88 which, in turn, corresponds with a key 14.

It will be clear that, although apparatus has been described for punching and printing upon paper tape, the invention is adapted to other types of application. For example, predetermined code groups on a disc such as the disc 20 can be utilized for actuating magnetic recording elements. Similarly, the cams or pins of disc 20 may be employed for purposes of printing, as might be used in connection with a photo-electric reading device.

Similarly, attention is directed to the fact that the arrangement of the stops 88 on the shaft 16 avoids the necessity for using mechanical and/or electrical matrices, thereby obviating the need for employing this conventional and expensive equipment.

Furthermore, the use of the rotary source of power contemplated by the invention, along with the associated storage device for driving the shaft 16, provides a continuous source of power, which avoids the need for employing clutches or like components or, alternatively, the use of means for continuously switching the source of rotary power on and off.

The invention also provides for simultaneously effecting two correlated marking operations which, for example, may be a punching and a printing operation, as has been indicated.

Advantageously, although the punching pins of the structure of the invention must be aligned with close tolerances, the associated apparatus for actuating these pins may be readily fabricated without holding close tolerances, such that the associated mechanism is extremely economical.

In one form, the invention may be considered as providing recording means including a plurality of recording devices, such as those associated with the disc 20; selection means including the shaft 16 and stops 88 are coupled to the disc 20 and associated elements for selectively positioning the code groups of pins 22. The power source 158 is effectively coupled by the storage device or spring 166 to the shaft 16, and thus to the selection means for permitting an operation of the latter. The storing power by the storage device enables the power source to be operated independently of the power required by the selection means.

The keys 14 and associated levers and interposers constitute actuating means. The actuating means not only operate to engage stops 88, but also to effect the operation of the tape stepping means, including sprocket wheel 34. Furthermore, the actuating means provides for the properly timed axial displacement of the disc 20.

It is to be noted that, if desired, the punching and printing operations can be respectively effected on separate tapes so that two separate records are provided.

Clarity of illustration does not permit of showing a composite view of the various components of the structure of the invention and, in fact, various conventional supporting devices which may be parts of or affixed to the frame 10 have been omitted for purposes of simplification. Supporting structure is, however, entirely within the purview of those skilled in the art.

There will further be obvious to those skilled in the art many modifications and variations of the structure set forth. These modifications and variations will not, however, depart from the scope of the invention, as defined in the following claims.

What is claimed is:

1. Apparatus for recording data on a record medium comprising recording means including a plurality of recording devices adapted for being positioned adjacent said medium, selection means coupled to said recording means for selectively positioning the recording devices relative to said medium so that at least one of said devices is positioned to record data on the medium, a power source adapted for being coupled to the selection means to provide power for the operation of the latter, and a storage device coupling the power source to the selection means for storing power supplied by the source and continuously applying power to the selection means for positioning the recording devices and maintaining the same in proper position, the storing of power by the storage device enabling the power source to operate independently of the power supplied to the selection means.

2. Apparatus as claimed in claim 1 wherein the recording means comprises a disc, groups of pins aligned along different radii of the disc and fixed thereupon to represent different code designations, and a group of punching pins operatively disposed with respect to the first said pins; said selection means comprising a shaft coupled to said disc for rotating the same and selectively aligning one of the first said groups with said groups of punching pins; said apparatus further comprising an actuator for urging the disc towards the punching pins to effect a punching operation.

3. Apparatus as claimed in claim 1 wherein the selection means comprises a shaft of relatively small diameter coupled to the recording means and rotatable by the storage device to position the recording devices, a plurality of stopping devices peripherally displaced about the shaft and correlated to respective ones of the recording devices, and means to engage the stopping devices selectively to prevent rotation of the shaft and thereby position the recording devices.

4. Apparatus as claimed in claim 1 wherein the power source comprises an electric motor and the storage device comprises a spring wound by said motor, said selection means comprising a shaft of relatively small diameter driven by said spring and coupled to the recording means.

5. Apparatus as claimed in claim 1 wherein the selection means comprises a rotatable shaft of relatively small diameter coupled between the storage device and recording means, a plurality of stops on and axially spaced along the shaft, the stops being correlated with the recording devices and angularly displaced around the shaft, a plurality of keys, a plurality of interposers displaceable by the keys into positions for engaging respective ones of the stops and thereby selectively stopping rotation of the shaft, and locking means for locking the interposers in engagement with the associated stop; said interposers each including means for engaging and temporarily deactivating the locking means in response to being displaced by a key whereby the previously displaced interposer is released.

6. Apparatus as claimed in claim 1 wherein the power source comprises an electric motor and means coupling the motor to the storage device for an irreversible supply of power to the storage device.

7. Apparatus as claimed in claim 1 comprising detection means sensitive to the amount of power stored in the storage device to actuate and inactivate said power source.

8. Apparatus as claimed in claim 1 comprising a governor coupled to the storage device to control the supply of power to the selection means.

9. Apparatus as claimed in claim 1 wherein the record medium is a material adapted for being punched, said recording means comprising means for respectively punching and printing on said medium.

10. Apparatus as claimed in claim 2 wherein the recording means further comprises a rotatable printing wheel coupled to the disc for rotation therewith, a block displaceably supporting the punching pins and accommodating said medium, a print cushion displaceably in said block and operatively disposed with respect to the medium and wheel and being displaceable by said disc.

11. Apparatus as claimed in claim 4 wherein the storage device further comprises a housing freely rotatable on said shaft, said spring being a spiral spring concentric with the shaft and including one end connected to the shaft and another end connected to the housing, said housing being coupled to and rotated about said shaft by said motor.

12. Apparatus as claimed in claim 6 wherein the means coupling the motor to the storage device comprises a gear train for the transfer of power and a ratchet device operatively associated with the gear train to provide said irreversibility.

13. Apparatus as claimed in claim 7 wherein the selection means includes a rotatable shaft of relatively small diameter driven by said storage device and the detection means comprises a threaded portion coupled to and rotating with the shaft, a threaded member engaging said portion for movement thereupon in response to power supplied to the storage device and the rotation of said shaft, and at least one switch operatively disposed with respect to the threaded member for actuation thereby, the switch being connected to the motor for controlling the same.

14. Data processing apparatus comprising data indicating means adapted for assuming different positions to record different data, a power source for providing the power whereby said means assumes the different positions, and coupling means coupling the source to the data indicating means and storing power supplied by the source, the coupling means releasing power to the data indicating means independently of the supply of power by said source and maintaining the indicating means in position.

15. Data processing apparatus comprising a power source, data recording means adapted for assuming different positions to record different data, resilient means coupling the recording means to the source for driving the recording means through the different positions, and selection means engaging the recording means for stopping the latter at a selected one of the positions, the resilient means enabling the recording means to be stopped independently of the operation of said source and maintaining the recording means in position.

16. Data recording apparatus comprising a selectively rotatable shaft, a disc rotatable but axially slidable on the shaft, groups of cams fixed on the disc in respective radial alignments in accordance with a predetermined code, the cams being generally parallel to said shaft, and punching pins in fixed radial alignment to the shaft for being selectively engaged by the groups in accordance with the rotation of the disc and axial displacement of the latter.

17. Apparatus as claimed in claim 16 comprising a housing supporting the pins for axial displacement by said cams, the housing defining a passage for accommodating a medium adjacent the pins.

18. Apparatus as claimed in claim 17 comprising a printing wheel adjacent the passage and coupled to the disc for rotation therewith, and a print cushion in the housing for displacement by the disc against the medium for urging the latter against the wheel.

19. Apparatus for selectively rotating a disc having angularly spaced recording elements comprising a shaft for driving the disc, stops axially spaced along the shaft and angularly displaced around the shaft in correlation with said elements, and means operatively disposed with respect to said shaft for engaging the stops selectively.

20. Apparatus as claimed in claim 19 wherein said means comprises spaced members displaceable to positions whereat they abut with said stops.

21. Apparatus as claimed in claim 20 comprising a locking bar common to all of said members for locking the members in abutting relationship with the stops.

22. Apparatus as claimed in claim 20 comprising springs urging the members to positions whereat they are free of the stops.

23. Apparatus as claimed in claim 20 wherein the members include portions for engaging the locking bar and temporarily displacing the same to an inactive position whereby, when one of said members moves to a position to abut a stop, a previously locked member is released.

24. In a paper punch mechanism having a rotatable shaft with axially displaced stops, an actuator and control apparatus comprising members operatively disposed with respect to and displaceable to engage the stops, springs coupled to and urging the members to positions whereat they are free of the stops, pivotal levers operatively disposed with respect to the members for urging the same into positions for engaging the stops, and keys operatively disposed with respect to and manually displaceable to control the levers.

References Cited in the file of this patent

UNITED STATES PATENTS

| | | |
|---|---|---|
| 832,035 | Buckingham et al. | Oct. 2, 1906 |
| 1,971,680 | Gubelmann | Aug. 28, 1934 |
| 2,633,198 | Naxon | Mar. 31, 1953 |
| 2,854,113 | Hallden | Sept. 30, 1958 |
| 2,859,816 | MacNeill | Nov. 11, 1958 |